July 14, 1942.    W. W. RODGERS    2,289,458
MAGNETIC WELDING CHUCK
Filed Nov. 7, 1940    2 Sheets-Sheet 1

WITNESS
H. Woodard

Inventor
William W. Rodgers
By H. B. Wilson & Co.
Attorneys

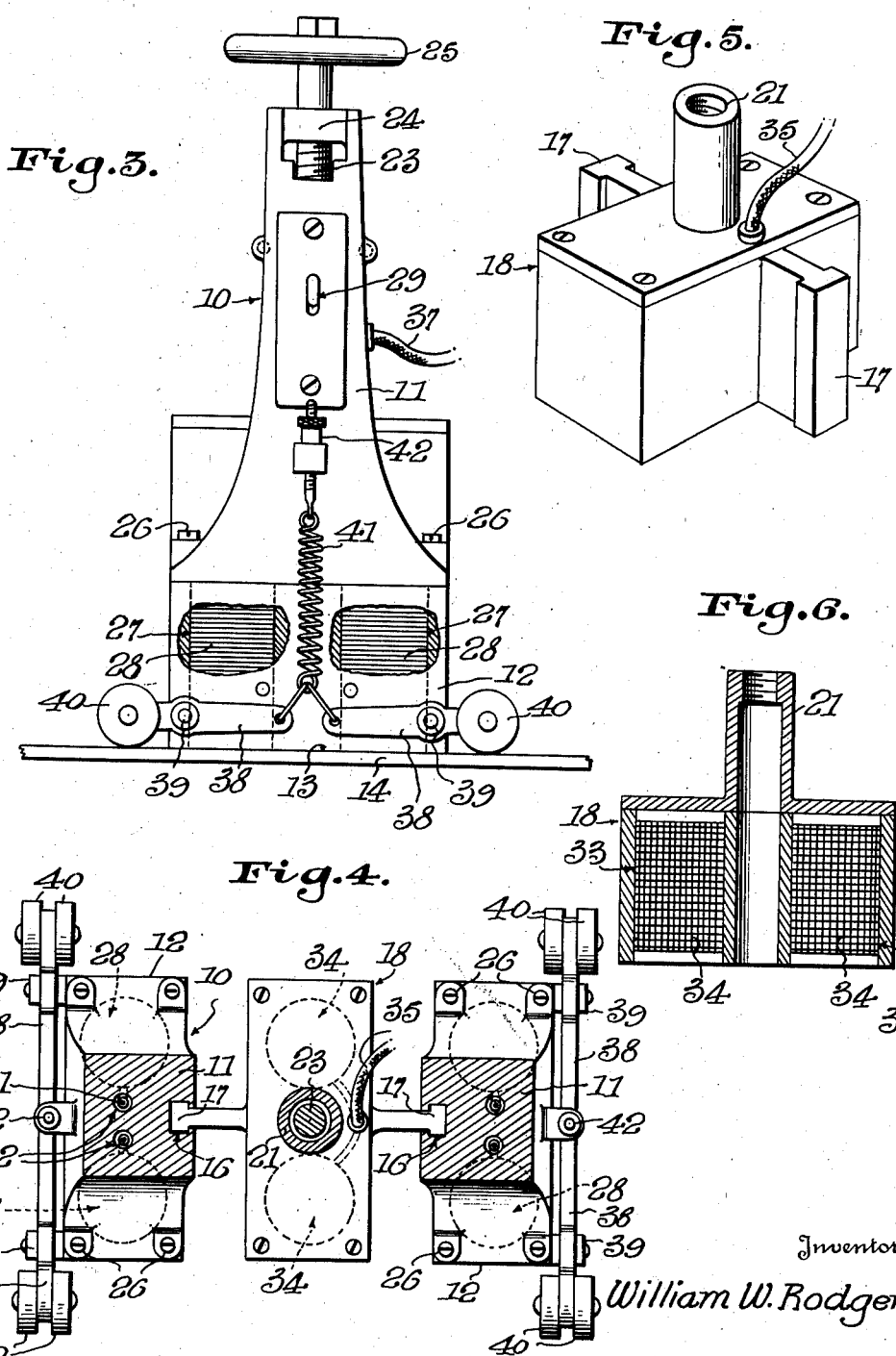

Patented July 14, 1942

2,289,458

UNITED STATES PATENT OFFICE 2,289,458

MAGNETIC WELDING CHUCK

William W. Rodgers, Ruxton, Md.

Application November 7, 1940, Serial No. 364,727

5 Claims. (Cl. 29—89)

The invention aims to provide a new and improved work holder or chuck of magnetic nature, designed primarily for holding angle bars against metal plates while tack welding the two together, saving trouble, time and expense.

A further object is to provide the chuck with novel means operative to lift it from the plate and support it upon rollers or the like for movement to another position, when the electro-magnet circuit is broken after use of the chuck in one position.

A still further object is to provide a chuck construction which is rather simple and inexpensive, yet efficient, durable and desirable from all standpoints.

Fig. 3 is a side elevation at right angles to Fig. 2, partly broken away and in section.

Fig. 4 is a horizontal sectional view as indicated by line 4—4 of Fig. 2.

Fig. 5 is a perspective view of the vertically movable work-clamping member.

Fig. 6 is a vertical sectional view of the member shown in Fig. 5.

Figure 1:
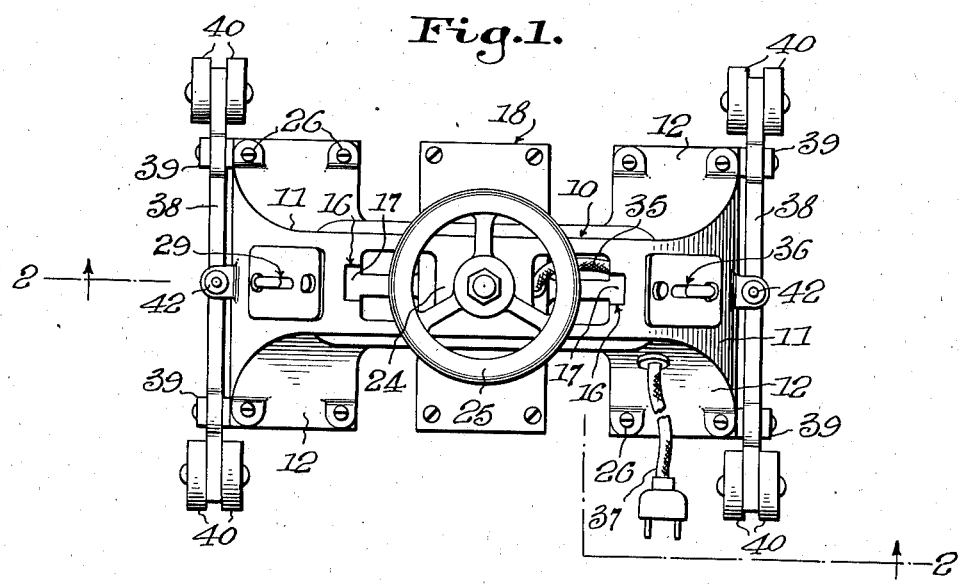
Figure 1 is a top plan view.
Figure 2:
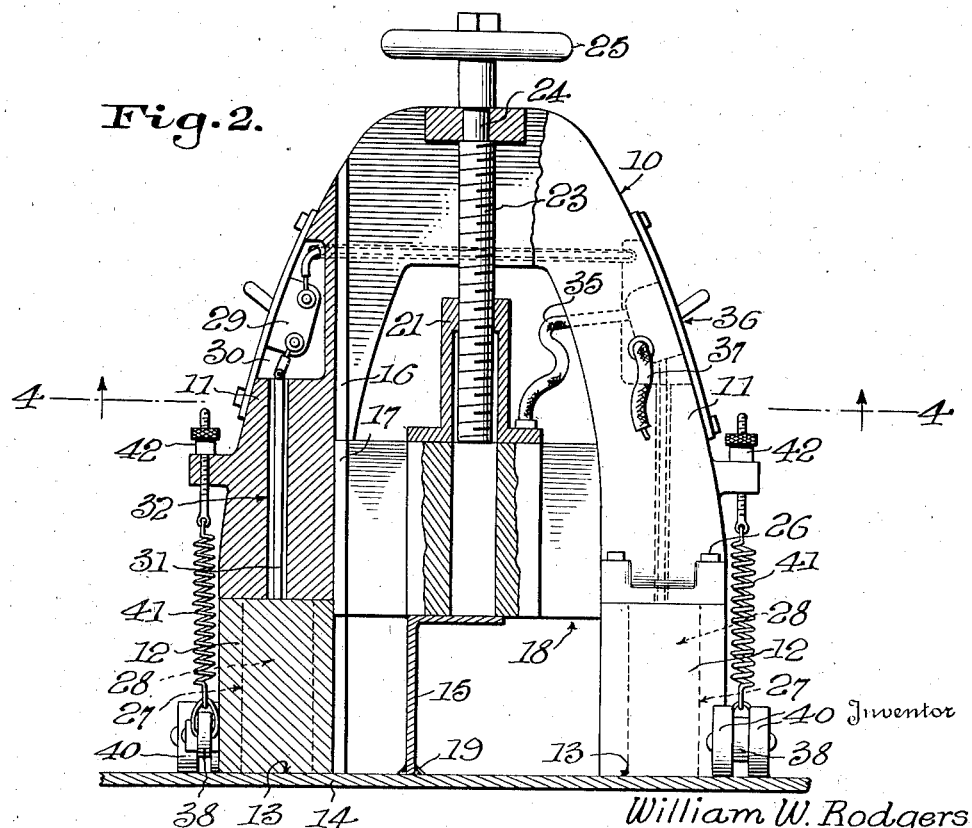
Fig. 2 is a vertical sectional view partly in elevation as indicated by line 2—2 of Fig. 1.

A preferred construction has been illustrated and will be rather specifically described, with the understanding, however, that within the scope of the invention as claimed, variations may be made.

An arched yoke 10 is provided, the legs 11 of said yoke being provided with parallel feet 12 which project in opposite directions therefrom, said feet having flat lower surfaces 13 to rest upon a plate or the like 14 to which one or more pieces of angle metal, such as 15, must be tack welded, preparatory to a complete welding of plate and angle together. The inner opposed sides of the legs 11 are provided with vertical guides 16 which slidably receive guide flanges 17, on a clamp member 18, which member is intended to hold the metal angle 15 against the plate 14 while the tack welding 19 is being accomplished, said clamp member 18 being provided with a flat lower side in a plane parallel with the lower sides 13 of the feet 12, insuring that the angle 15 shall be held perpendicular to the plate 14 when the chuck is operatively positioned. The clamp member 18 is provided with a fixed nut 21 into which a vertical adjusting screw 22 is threaded, said screw being swiveled at 23 in a bearing 24 in the crown portion of the yoke 10 and being provided with a hand wheel or the like 25 by means of which said screw may be rotated to vertically adjust the clamp member 18. It is preferable that the feet 12 be separate from the legs 11 and secured thereto by bolts or the like 26.

The feet 12 are formed with recesses 27 in which electro-magnets 28 are mounted for anchoring said feet to the plate 14. A suitable switch 29 is provided for the electro-magnets 28, said switch being mounted in a recess 30 in one of the legs 11 and being operatively connected with said magnets by suitable conductors 31 extending through appropriate passages 32.

The clamp member 18 is also provided with openings 33 in which electro-magnets 34 are mounted to hold said clamp member against the metal angle or the like 15. 35 denotes suitable conductors extending to the electro-magnets 34 from a switch 36 mounted similarly to the switch 29. A supply cord for both sets of electro-magnets (28 and 34) is shown at 37.

When the yoke 10 is placed astride a metal angle or the like 15 with its feet 12 properly positioned with respect to a plate such as 14, and the electro-magnets 28 are energized, they securely anchor the base of said yoke 10 to said plate or the like, whereby the screw 22 may be operated to cause the clamp member 18 to tightly clamp the angle 15 against the plate or the like while it is being tack welded thereto. Furthermore, by energizing the electro-magnets 34 of the clamp member 18, it is insured that there shall be no slippage between this clamp member and the angle 15. Also, such energizing permits the clamp member 18 to hold the angle 15 prior to tightening of the screw 22 and forcing of said angle against the plate 14, if desired.

The entire tool is to be moved along the angle or the like 15 while said angle or the like is being tack welded, a weld being made at one point with the tool in one position, the tool being then moved to another position and the welding being done at another point, and so on until the desired number of tacks have been effected. To facilitate moving of the tool from each position to the next, novel provision is made, which provision is preferably of the construction now to be described.

Two levers 38 are fulcrumed between their ends at 39 to the outer side of each foot 12, the outer ends of these levers being provided with rollers 40 to rest upon the plate or the like 14. The inner ends of the levers 38 are connected with a vertical tension spring 41 whose upper end is adjustably anchored at 42 to the yoke 10. The strength of the two springs 41 is such that when the electro-magnets of the tool are deenergized and there is nothing to hold said tool down but its own weight, said springs will tilt the levers 38 to lift the yoke 10 and parts carried thereby free of the plate and angle which they previously engaged. The entire tool can then be readily rolled from one position to another upon the rollers 40 and when the electro-magnets are again energized, the springs 41 will yield and permit the tool to again lower to operative position.

Excellent results are obtainable from the details disclosed and they are preferably followed. However, within the scope of the invention as claimed, variations may be made as above stated.

I claim:

1. A magnetic chuck for holding a metal angle against a metal plate while connecting the two, comprising an arched yoke having feet on its legs to rest on the plate, the crown of said arched yoke being provided with a bearing at an angle to said feet, a clamp member between and slidably engaged with said legs for holding the metal angle against the plate, an adjusting member for said clamp member engaged with the latter and with said bearing, and electro-magnets carried by said feet for anchoring them against said plate.

2. A magnetic chuck for holding a metal angle against a metal plate while connecting the two, comprising an arched yoke having feet on its legs to rest on the plate, the crown of said arched yoke being provided with a bearing at an angle to said feet, a clamp member between and slidably engaged with said legs for holding the metal angle against the plate, an adjusting member for said clamp member engaged with the latter and with said bearing, electro-magnets carried by said feet for anchoring them to said plate, and an additional electro-magnet carried by said clamp member for holding the metal angle against said clamp member prior to tightening of said adjusting member and thereafter.

3. A magnetic chuck for holding one member against another while connecting the two, comprising a base having an elctro-magnet for anchoring it to one of said members, means on said base for holding the other member against said one member, and thrust means carried by said base and having portions to thrust against said one member and means urging said portions in a thrust direction acting to lift said base from said one member when the circuit of said electro-magnet is broken, said portions of said thrust means being disposed in such spaced relation that they may act as stable supports for the entire chuck while moving it from one position to another upon said one member.

4. A magnetic chuck for holding one member against another while connecting the two, comprising a base having an electro-magnet for anchoring it to one of said members, means on said base for holding the other member against said one member, and spring-actuated thrust means carried by said base and having portions to thrust against said one member and lift said base from said one member when the circuit of said electro-magnet is broken, said portions of said thrust means being disposed in such spaced relation that they may act as stable supports for the entire chuck while moving it from one position to another upon said one member.

5. A structure as specified in claim 4; said spring-actuated thrust means comprising vertically swingable levers fulcrumed to said base and having rollers constituting said portions, and spring means acting on said levers and reacting on said base to swing said levers in base-lifting direction when the electro-magnet circuit is broken.

WILLIAM W. RODGERS.